No. 735,784. PATENTED AUG. 11, 1903.
J. LAW, DEC'D.
K. J. LAW, EXECUTRIX.
HAY STACKER.
APPLICATION FILED OCT. 10, 1902.
NO MODEL. 2 SHEETS—SHEET 1.
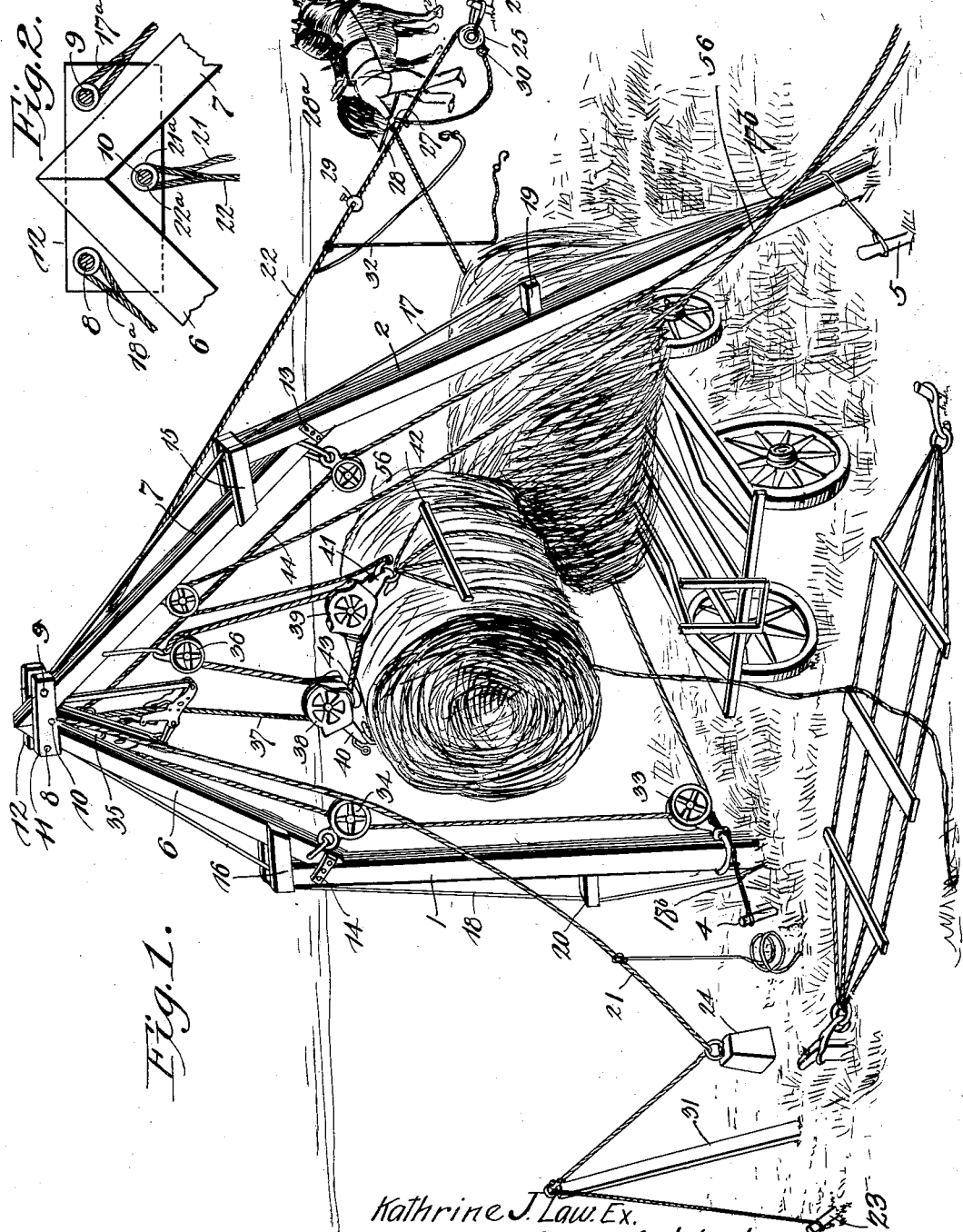
Witnesses
Kathrine J. Law, Ex.
Estate of John Law, Inventor, Deceased
by C. A. Snow & Co.
Attorneys No. 735,784. PATENTED AUG. 11, 1903.
J. LAW, DEC'D.
K. J. LAW, EXECUTRIX.
HAY STACKER.
APPLICATION FILED OCT. 10, 1902.
NO MODEL. 2 SHEETS—SHEET 2.
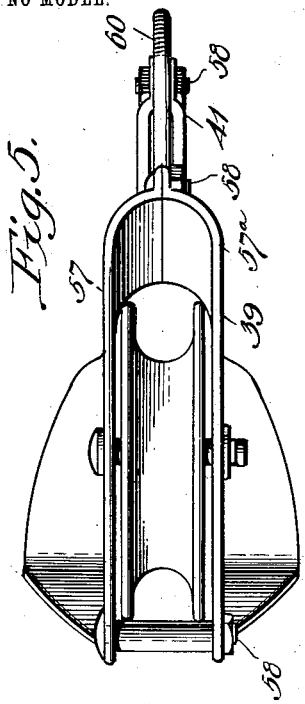
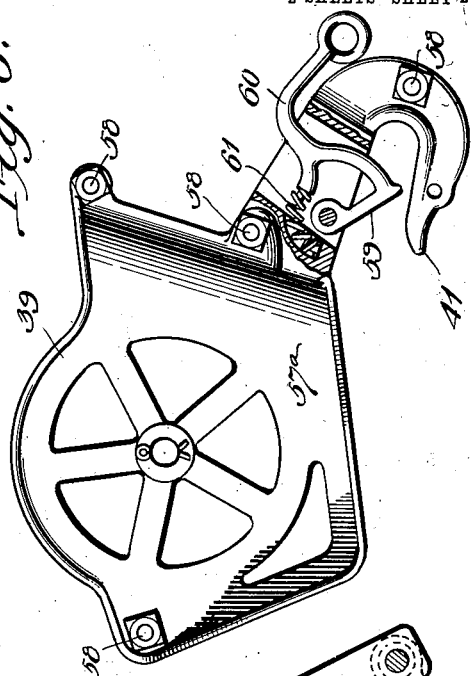
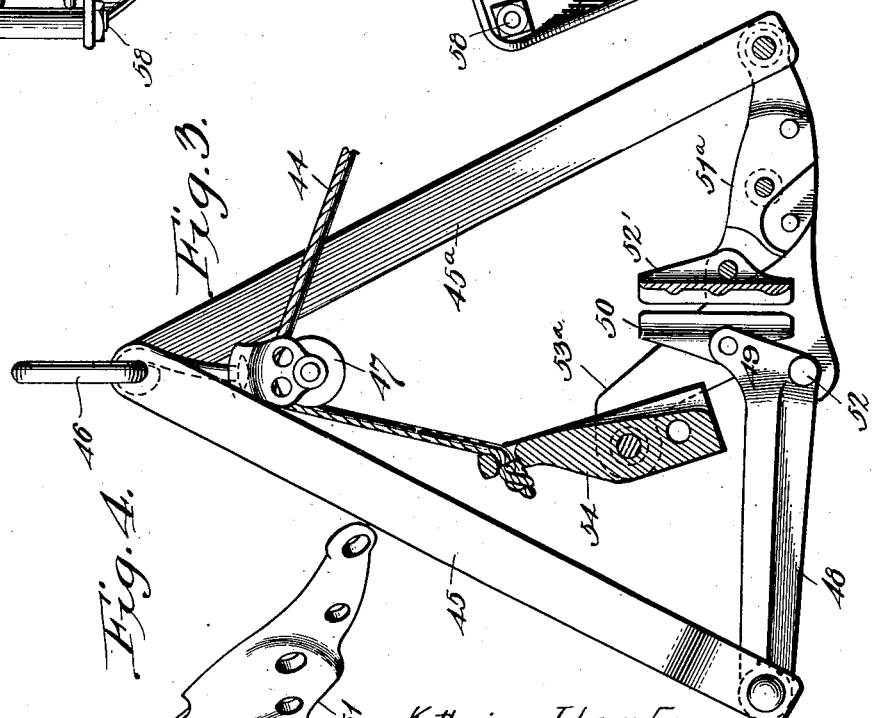
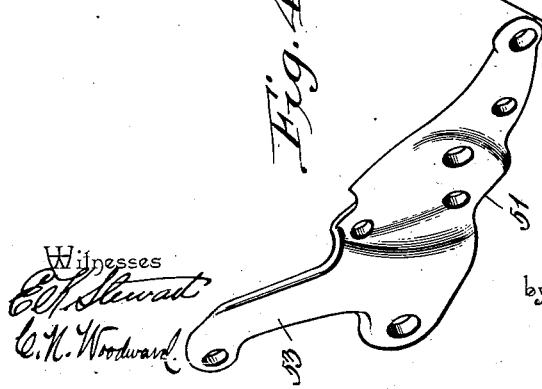
Witnesses
E. F. Stewart
C. H. Woodward
Kathrine J. Law, Ex.
Estate of John Law, Inventor, Deceased.
by C. A. Snow & Co.
Attorneys No. 735,784. Patented August 11, 1903.

UNITED STATES PATENT OFFICE.

KATHRINE JAMIMA LAW, OF MERRIAM PARK, MINNESOTA, EXECUTRIX OF JOHN LAW, DECEASED.

HAY-STACKER.

SPECIFICATION forming part of Letters Patent No. 735,784, dated August 11, 1903.

Application filed October 10, 1902. Serial No. 126,809. (No model.)

*To all whom it may concern:*

Be it known that I, KATHRINE JAMIMA LAW, a citizen of the United States, residing at Merriam Park, in the county of Ramsey and State of Minnesota, executrix of the estate of JOHN LAW, deceased, late a citizen of the United States, and a resident of Merriam Park, St. Paul, in the county of Ramsey and State of Minnesota, as by reference to the duly certified copy of letters testamentary hereto annexed will more fully appear, do hereby declare that JOHN LAW invented a new and useful Hay-Stacker, of which the following is a specification.

This invention relates to hay stackers and loaders, and has for its object the production of an apparatus whereby hay and similar material and products may be conveniently loaded upon wagons or upon stacks; and the invention consists in certain novel features of construction, as hereinafter shown and described and then specifically pointed out in the claims.

In the drawings illustrative of the invention, Figure 1 is a perspective of the apparatus complete. Fig. 2 is an enlarged detached detail of the derrick-clamping mechanism. Fig. 3 is an enlarged side view, partially in section, of the rope-grip. Fig. 4 is a side view of one of the side plates of the rope-grip detached. Fig. 5 is a plan view, and Fig. 6 is a side view, partially in section, of one of the guide-pulleys for the draft-cable.

This apparatus may be employed for the purpose of loading wagons or cars or building stacks, and consists of a derrick-like framework erected at a suitable point adjacent to the place where the wagon or car is to be loaded or the stack erected, the derrick consisting of two main side timbers or posts 1 2, spaced apart and with their lower ends suitably secured by stakes 4 5, or, if preferred, cavities may be formed in the ground in which they will rest, the object being to so secure them as to resist lateral movement when the apparatus is in operation. The side timbers will preferably be distended at their lower ends, so that the largest possible area will be secured between the posts for the wagon, car, or other vehicle or a stack.

Attached to the upper ends of the side posts 1 and 2, respectively, are struts or braces 6 and 7, trending inwardly at an angle and connected together at their inner upper ends by bolts 8, 9, and 10, passing through brace-plates 11 and 12, and likewise secured to the upper ends of posts 1 and 2 by brace-plates 15 and 16, and further secured, preferably, by clips 13 and 14, as shown.

The parts will all be secured by bolts, as shown, so that they can be readily connected and disconnected for convenience of transportation.

Stay or brace rods or cables 17 18 are secured to the posts 1 and 2 and braces 6 and 7 to stengthen the posts and braces and enable them to withstand the severe strains to which they will be subjected and also to enable a lighter quality of material to be employed for the posts and braces. The upper ends of the stays 17 18 will be secured by loops $17^a$ $18^a$ therein to the outer bolts 8 and 9, by which the brace-plates 11 12 are secured, while their lower ends will be secured in the timbers 1 and 2, near their lower ends, as shown at $17^b$ $18^b$. Chocks or struts 19 20 are arranged between the stays 17 18 and the posts 1 2 intermediate of their lengths, as shown, to hold the stays outward away from the posts to secure the necessary "bracing" action at the lower portion of the stays, while a similar bracing action is obtained at the upper part of the stays owing to the stays passing over the upper outer ends of the posts 1 2 in their course along the framework, as shown. By this means the frame is greatly strengthened and provision made for the employment of smaller-sized timbers than if the stays were not employed.

21 22 indicate guys provided at their upper ends with eyes or loops $21^a$ $22^a$, respectively, adapted to be engaged by the bolt 10, which passes centrally through the brace-plates 11 12 and the guys, thus connecting the same between the plates beneath the meeting-point of the braces 6 7, as shown, while their lower ends will be secured to the ground, as hereinafter described.

The derrick or framework is designed to have its upper end moved forward and backward when in operation to carry the load after it has been elevated to a point above the wagon or other vehicle or stack, and there will be play enough between the guys to permit this movement. Thus the guy 21 will be of a length adapted to support the upper end of the derrick-frame in its position above the point where the load is to be received, while the guy 22 will be of a length adapted to support the upper end of the derrick-frame in its position above the wagon, stack, or other point of discharge of the load.

The guy 21, which is attached to the ground at its lower end by means of stake 23, is provided between its ends with a weight 24 for the purpose presently described. The guy 22, which is passed through a pulley 25, attached to a stake 26, is provided at its lower end with hook 27, adapted to be attached to whiffletree 28 of the draft-team, (indicated at 28ᵃ,) whereby the guy is operated to swing the upper end of the derrick forward and backward, as above described. The guy 22 is limited in its travel in the pulley 25 by means of suitable preferably adjustable stops 29 30, thus limiting the movement of the upper end of the derrick, which is moved in one direction by draft-animals and in the opposite direction by the weight 24. The stop 29 controls the distance to which the draft-animals will move the derrick, and the stop 30 controls the point to which the weight 24 will return the derrick. Greater freedom of action is imparted to the weight by sustaining the guy 21 away from the ground through the medium of strut 31. A shorter auxiliary guy or draft-rope 32 is shown coupled to the guy 22 between the pulley 25 and the point of connection with the derrick-frame and adapted to be connected to the whiffletree 28 of the draft-team. This may be employed to move the derrick instead of the extended end of the guy 22 and the pulley 25, if preferred; but the action and the results produced would be the same.

Attached to the derrick-frame at suitable points are draft-line-guide pulleys 33, 34, 35, and 36, over which the draft-line 37 leads, as shown. 38 and 39 are two other pulleys, located below the line of the pulleys 35 36, and provided with hooks 40 41, by which they are coupled to the "slings" 42 or other fastening or support for the load to be elevated. The end of the draft-cable 37 is attached at 43 to the frame of pulley 38 and carried thence up around pulley 36, thence downward around pulley 39, thence through pulley 38, thence through the rope-lock, over pulleys 35 34 33 to the whiffletree 28 of the draft-team, as shown.

When the load has been elevated to the proper point for swinging the derrick and released by the draft-animals, a cable-locking mechanism situated between the pulleys 35 and 38 locks the cable and sustains the load until the derrick has been swung to the proper point of discharge, when a slight pull upon rope 44 will release the lock and permit the load to descend. The lock automatically engages the cable to sustain the load whenever released by the draft-animals. The construction of this locking mechanism is more fully illustrated in Figs. 3 and 4, and consists in two bars 45 45ᵃ, connected together at their upper ends by a clip 46 and also supporting a guide-pulley 47 at the same point, as shown. The lower ends of the bars 45 45ᵃ diverge, and the bar 45 is pivotally connected to the outer ends of a lever-arm 48, as shown. The lever-arm 48 is extended upward at its inner end, as at 49, and provided with a jaw member 50, pivotally connected thereto centrally of the jaw. Pivotally connected to the lower end of the diverging bar 45ᵃ is another lever-arm formed of two members 51 51ᵃ, embracing the lower end of the bar 45ᵃ by their outer ends and passing inward and likewise embracing the inner free end of the lever-arm 48, to which they are pivotally engaged by studs 52. Between the members 51 51ᵃ is pivotally supported a jaw member 25, opposed to the jaw member 50 and arranged in alinement therewith, as shown. Extending from the members 51 51ᵃ are wings 53 53ᵃ, between whose upper ends a weight 54 is pivotally supported, and connected to this weight is the draw-cord 44, carried thence over the guide-pulley 47 to a point convenient to the hand of the operator, as indicated at 56. The opposing faces of the jaw members are concaved and alternately corrugated and adapted to inclose the draft-cable 37 in its course between the pulleys 35 and 38. By the construction shown of the lever-arms with the movable opposing jaw members carried between them when the lever-arms are moved downward the jaw members will be forcibly moved inward and very tightly clamp the draft-cable between them, as will be readily understood. By this simple arrangement so long as the draft-cable is moving upward the jaw members are ineffective; but the instant any downward movement begins the jaws will be moved downward and tightly clamp the draft-cable, the weight 54 greatly assisting in this action by adding its weight to the lever-arms. The trip-line 44 is a means by which the weight and lever-arms are raised to open the jaws and release the cable, and also enables the locking mechanism to be supported in an ineffective position when not required by drawing the lever-arms upward and holding them suspended. The usual trip-rope 56 will be employed to release the sling.

The operation is as follows: The derrick-frame will be erected with the posts 1 2 on opposite sides of the place where the wagon is to be loaded or the stack erected, with the guy-cables 21 22 properly located and connected and the weight 24 and the draft-cable and lock mechanism properly adjusted. If a wagon is to be loaded, it will be driven into proper position, with its rear part about in line beneath the upper part of the derrick-frame when in its backward or load-receiving position. Then when the load has been gripped the team, having been hitched to the draft-cable, is started forward and the load elevated to the proper distance. When the load has been elevated to a point nearly as high as required, the loose end of the guy 22 or the auxiliary draft-guy 32, as the case may be, is coupled to the whiffletree 27, and the continued forward movement of the team will cause the derrick to be tilted over, carrying the load with it, and thus placing it in position above where it is to be discharged. At the first pause of the team the load will settle downward, causing the jaw members to automatically grip the cable and hold the load suspended. When the load is to be released, a slight pull on the lock-line 44 will trip the lock mechanism and release pulleys 38 39 to permit the load to descend. The weight 24 will immediately return the derrick-frame to its former position ready for another load. The wagon may then be adjusted to bring it in proper position to receive the balance of the load, or the location of the stops 29 30 or the auxiliary guy 32 may be adjusted to cause the derrick-frame to be tilted to a greater or lesser distance to adapt the discharge-point to the requirements of the work. The same adjustment may be employed when used in connection with a stack to cause the load to be delivered upon any part of the stack. The second bundle elevated upon the wagon does not require the derrick to swing as far as the first bundle, and instead of moving the receiving-vehicle a short auxiliary guy-cable 32 may be attached to the guy 21 just in advance of the weight 24 to limit the movement of the guy-cable 21 and correspondingly limit the swinging movement of the derrick-frame, and this same arrangement can be employed in stacking to discharge the loads upon different parts of the stack.

The pulleys 38 39 are substantially duplicates, the only difference being that the pulley 38 is provided with means for the attachment of the draft-cable 37, as above noted. The pulleys are denoted as a whole at 38 39, and their construction is shown in Figs. 5 and 6, each pulley being incased in a frame formed of two parts 57 57ª, united by tie-bolts 58, and each with its hook 40 41, respectively, by which the opposite ends of the sling 42 are supported. Within each of the hooks is pivotally supported a trip-latch 59, the trip-latch having an extended arm 60, to which the trip-line 56 is connected. Each of the trip-latches is maintained normally closed by a spring 61. The arm 60 is connected to the latch 59 at its lower end, so that any outward strains to which the latch is subjected from the sling will tend to bind it against the outer end of the hook, and thus prevent it from being accidentally released and releasable only by a pull upon the releasing-cord.

Having thus described the invention, what is claimed is—

1. In a hay stacker and loader, the combination with a derrick-frame movably supported at its lower end and adapted to swing at its upper end, means sustained by the frame for elevating the load, a cable leading from said elevating means and adapted to be attached to the source of power, and a cable adapted to swing the frame and to be also attached to the source of power, whereby the frame will be swung simultaneously with the elevating of the load.

2. In a hay stacker and loader, the combination with a derrick-frame movably supported at its lower end and adapted to swing at its upper end, means for swinging the frame, a load-elevating means sustained by the frame and adapted to elevate the load as the frame is swung and means for automatically locking the load-elevating means when the frame ceases to swing.

3. In a hay stacker and loader, the combination with a derrick-frame movably supported at its lower end and adapted to swing at its upper end, means sustained by the frame for elevating the load, a cable leading from said elevating means and adapted to be attached to a source of power, a cable adapted to swing the frame and to be also attached to the source of power, and means for automatically locking the load-elevating cable when the draft upon the said cable ceases, whereby the frame will be swung and the load simultaneously elevated, and the load locked in its elevated position simultaneously with a cessation of the swinging of the frame.

4. In a hay stacker and loader, the combination in a derrick-frame, of side posts spaced apart and diverging outwardly and downwardly, brace members connected to said side posts and converging to a central point and united at their meeting-points, and brace-cables supported by their ends upon the outer sides of said side posts and brace members and at an angle thereto, substantially as described.

5. In a hay stacker and loader, a derrick-frame supported at its lower end and free to swing by its upper end, means for limiting the movement of said derrick in one direction, a guide-pulley fixed at a point on the opposite side of said derrick, a guy-cable fixed by one end to said derrick and threaded through said pulley, a stop upon said guy-cable on the outer side of said pulley, load-hoisting means supported from said derrick-frame, a cable disposed to operate said load-hoisting means, and means whereby the free end of said guy-cable may be coupled to said draft-cable to cause said guy-cable to operate said derrick-frame, substantially as described.

6. In a hay stacker and loader, the combination in a derrick-frame of side posts spaced apart and diverging outwardly and downwardly, brace members connected to the upper ends of said side posts and converging to a central point, clamp-plates engaging the opposite sides of said brace members at their meeting-points and connected by transverse bolts, brace-cables connected by their upper ends to said transverse bolts and by their lower ends to said side posts, substantially as described.

7. In a hay stacker and loader, the combination in a derrick-frame of side posts spaced apart and diverging outwardly and downwardly, brace members connected to the upper ends of said side posts and converging to a central point, clamp-plates engaging the opposite sides of said brace members at their meeting-points and connected by transverse bolts connecting said clamp-plates outside said brace members, a central transverse bolt connecting said clamp-plates beneath said brace members, and guy-cables connected to said central bolt and leading in opposite directions from said derrick-frame, substantially as described.

8. In a hay stacker and loader, a derrick-frame movably supported by its lower end, a stationary guide-pulley, a guy-cable leading from said derrick-frame and through said guide-pulley, a lower stop upon said guy-cable on the far side of said guide-pulley, an upper stop upon said guy-cable between said guide-pulley and said derrick-frame, and means for drawing the portion of said guy-cable between said stops through said guide-pulley, to cause said derrick-frame to be operated, substantially as described.

9. In a hay stacker and loader, a derrick-frame movably supported by its lower end, a stationary guide-pulley, a guy-cable leading from said derrick-frame and through said guide-pulley, a lower stop upon said guy-cable on the far side of said guide-pulley, an upper stop upon said guy-cable between said guide-pulley and said derrick-frame, means supported from said derrick-frame for elevating the load, a draft-cable leading from said load-elevating means, means for forcibly moving said draft cable, and means for detachably connecting said guy-cable to said draft-cable, substantially as described.

10. In a hay stacker and loader, a derrick-frame movably supported by its lower end, a stationary guide-pulley, a guy-cable leading from said derrick-frame and through said guide-pulley, a lower stop upon said guy-cable on the far side of said guide-pulley, an upper stop upon said guy-cable between said guide-pulley and said derrick-frame, an auxiliary draft-cable connected to said guy-cable between said upper stop and said derrick-frame and adapted to be connected to the draft-power, substantially as described.

11. In a hay stacker and loader, a derrick-frame movably supported by its lower end, a guy-cable leading rearwardly from said derrick-frame and passing through a guide-pulley, a guy-cable passing forwardly from said derrick-frame and immovably supported at its lower end, means for forcibly moving said rearward guy-cable through said guide-pulley, and an auxiliary-stop guy-cable attached to said forward guy-cable, and adapted to limit the movement of the derrick-frame, substantially as described.

12. In a hay stacker and loader, a derrick-frame, a load-elevating means supported from said derrick-frame, a draft-cable connected to operate said load-elevating means, diverging bars suspended from said derrick-frame, transverse lever-arms movably connected to said bars and centrally united, and opposing jaw members carried by said lever-arms and inclosing said draft-cable and adapted to move outward when said arms are moved upward and to move inward in engagement with the cable when said arms are moved downward, substantially as described.

13. In a hay stacker and loader, a derrick-frame, a load-elevating means supported from said derrick-frame, a draft-cable connected to operate said load-elevating means, diverging bars suspended from said derrick-frame, transverse lever-arms movably connected to said bars and centrally united, opposing jaw members carried by said lever-arms and inclosing said draft-cable and adapted to move outward when said arms are moved upward and to move inward in engagement with the cable when said arms are moved downward, a weighted bar carried by one of said lever-arms, and a trip-cord connected to elevate said weight-arm, substantially as described.

14. In a hay stacker and loader, a derrick-frame, spaced cable-pulleys carried by said derrick-frame, a sling for the load to be elevated, cable-pulleys connected to the opposite ends of said sling, a draft-cable connected by one end to one of said sling-supported cables and woven thence through the other of said sling-supported pulleys, and thence through one of said spaced pulleys, and thence through said initial sling-supported pulley, and thence through said other spaced pulley, whereby said sling may be simultaneously moved upward and drawn tightly about the load, substantially as described.

15. In a hay stacker and loader, a derrick-frame consisting of side posts spaced apart and converging upwardly and united at their meeting-points, clamp-plates embracing the sides of said side posts at their meeting-points, transverse bolts engaging said clamp-plates outside said side posts, brace-cables engaging said bolts between said side plates and leading downwardly and engaged to said side posts near their lower ends, and chocks between said brace-cables and said side posts, substantially as described.

16. In a hay stacker and loader, a derrick-frame consisting of side posts spaced apart and converging upwardly and united at their meeting-points, clamp-plates embracing the sides of said side posts at their meeting-points, transverse bolts engaging said clamp-plates outside said side posts, a transverse bolt engaging said clamp-plates beneath said side posts at their meeting-points, guide-cables connected to said central transverse bolts between said plates and leading in opposite directions from said derrick and connected at a distance therefrom, substantially as described.

17. In a hay stacker and loader, a derrick-frame movably supported by its lower end, a guide-pulley supported at a distance in the rear of said derrick, a guide-cable leading rearwardly from said derrick and engaging said guide-pulley, a stop upon said cable at the far side of said pulley, a stop upon said cable between said guide-pulley and derrick, a guy-cable leading forwardly from said derrick and supported at its lower end at a distance from the derrick, a weight carried by said forward guy-cable, and means for forcibly drawing said rearward guy-cable through said guide-pulley, substantially as described.

In testimony that I claim the foregoing as the invention of JOHN LAW, I have hereto affixed my signature in the presence of two witnesses.

KATHRINE JAMIMA LAW,
*Executrix of the estate of John Law, deceased.*

Witnesses:
JOE M. HACKNEY,
R. M. CECIL.